March 25, 1969     B. WEISSMAN     3,434,209

METHOD FOR BUILDING SUPERSTRUCTURES ON DENTITION

Filed May 12, 1965

INVENTOR.
BERNARD WEISSMAN
BY
Friedman & Goodman
ATTORNEYS

United States Patent Office 3,434,209
Patented Mar. 25, 1969

3,434,209
METHOD FOR BUILDING SUPERSTRUCTURES ON DENTITION
Bernard Weissman, 304 Ashland Place, Brooklyn, N.Y. 11217
Filed May 12, 1965, Ser. No. 455,259
Int. Cl. A61k 5/02
U.S. Cl. 32—15      3 Claims

ABSTRACT OF THE DISCLOSURE

The invention is directed to a method of building a superstructure on a tooth comprising removing the decayed dentition, drilling a plurality of nonparallel channels into the tooth from the resulting excavated surface thereof, threading a rod into each channel so that a portion thereof projects above said surface, and building a superstructure on said surface. The invention is also directed to a novel combination comprising a reinforcing rod and a latching wrench therefor.

---

The present invention relates generally to dentistry and in particular, to a method and apparatus for building superstructures on broken or undermined dentition.

It is an object of the present invention to provide a highly novel and effective method for building superstructures on broken or undermined dentition.

It is another object of the present invention to provide such a method wherein the understructure of the tooth is reinforced to the maximum potential of total support value.

It is a further object of the present invention to provide highly novel, efficient and long-lasting reinforcement or anchor rods for building superstructures on broken or undetermined dentition.

In accordance with the foregoing object of the present invention, it is a still further object to provide a highly novel and efficient means for inserting such rods in the understructure of the dentition.

Other and further objects and advantages of the present invention will be readily apparent to one skilled in the art from a consideration of the following specification taken in connection with the appended drawing.

In the drawing, which illustrates the best mode presently contemplated for carrying out the invention:

Figure 1:
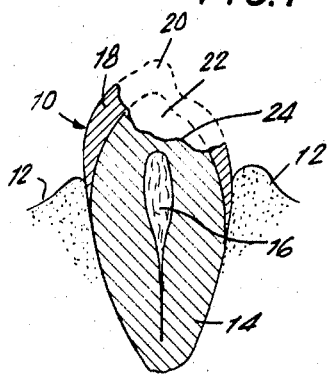
FIGURE 1 is a cross-sectional view of a tooth or dentition with its surface excavated prior to building a superstructure thereon.
Figure 2:
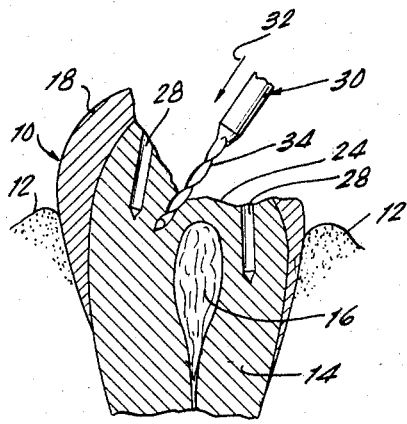
FIGURE 2 is an enlarged view similar to FIGURE 1 and illustrates the step of providing channels in the dentition pursuant to the present invention.

Referring now to the drawings in detail, FIGURE 1 illustrates a tooth or dentition 10 in the soft tissue or gingiva 12 of the human gum. As is well known to those skilled in the art, the body 14 of the tooth is formed of dentin and encloses a pulp channel 16. The dentin projecting from the gingiva is covered by a layer 18 of enamel. In order to prepare the dentition for building a superstructure thereon, a portion 20 of the enamel and a portion 22 of the dentin is excavated to remove the decay and undermined tooth structure so as to provide the excavated surface 24 with the decay removed. Any required root canal work may be accomplished at this time.

Figure 4:
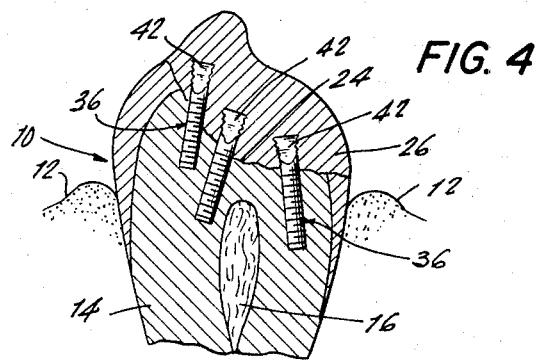
FIGURE 4 is a view similar to FIGURE 2 and illustrates the built-up superstructure pursuant to the present invention.
Figure 5:
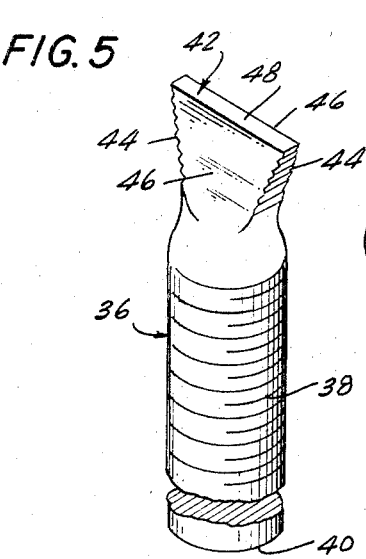
FIGURE 5 is an enlarged view which illustrates a reinforcing or anchor rod.

The first step in providing a superstructure 26 (FIGURE 4), pursuant to the present invention, is to provide a plurality of nonparallel channels 28 extending into the dentin 14 from the uncovered excavated surface 24. For this purpose, a spiral drill 30 is urged into the dentin, in conventional manner, as indicated by the arrow 32. As presently constructed, the bit 34 of drill 30 has a diameter preferably of .028 inch. The number of nonparallel channels 28 will depend upon the size and depth of the excavation. It will be noted that the various channels 28 have been drilled so as not to enter the pulp channel 16, the channels 28 being directed away from the pulp channel.

Figure 3:
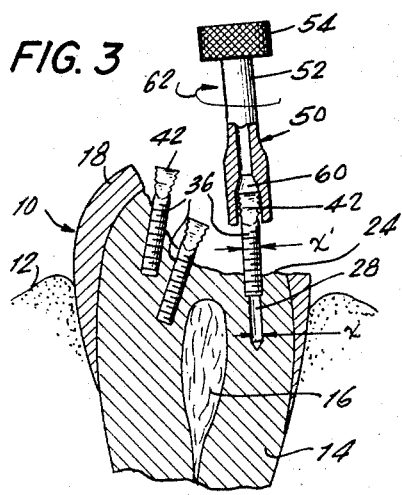
FIGURE 3 is a view similar to FIGURE 2 and illustrates the step of providing reinforcing or anchor rods in the channels.

In accordance with the next step in the process of the present invention, a reinforcing or anchor rod 36 is inserted into each channel. Rods 36 are formed preferably of stainless steel and are provided with self-threading body portions 38. One end of each body portion 38 is provided with a bevel end 40 and the other end is provided with an anchor head 42. The anchor head 42 is provided with outwardly flared and ridged ends 44 and with opposing side surfaces 46 which taper toward the marginal edge 48. As presently constructed, the self-threading body portions 38 have a diameter of .030 inch. Consequently, it will be apparent that the dimension X′ in FIGURE 3, representing the diameter of the rod body 38 is greater than the dimension X, representing the diameter of the drilled channel 28.

Figure 6:
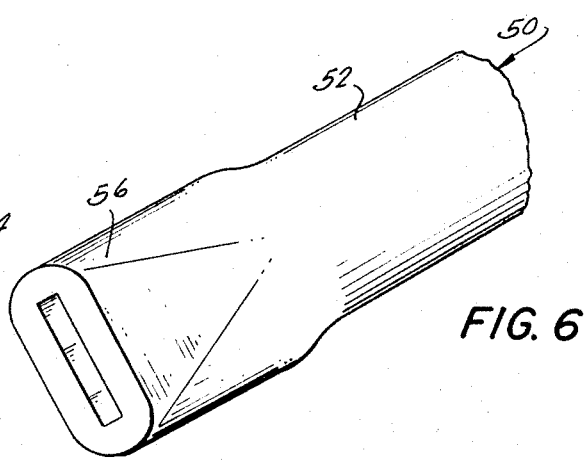
FIGURE 6 is an enlarged fragmentary view of the latching wrench for the reinforcing rods.

In order to insert into each channel 28 a companion rod 36, provision is made for the self-latching wrench 50. As best shown in FIGURES 3 and 6, the wrench 50 comprises a wrench body 52 provided at one end with a knurled head 54. At its other end 56, body 52 has a latching opening 58 which is adapted to receive the anchor head 42 of the rod 36. As will be noted from FIGURE 3, the opening 58 has a restricted portion 60 into which the anchor head can be wedged.

In order to insert a rod 36 into a channel 28, the rod is picked up by means of the wrench 50 by inserting the head 42 of the rod into latch opening 58 until the head is wedged in constricted portion 60. With slight downward pressure, the bevel end 40 of the rod is inserted into a channel 28 and the wrench is turned in a clockwise direction, as shown by arrow 62, until resistance is felt, indicating the floor of the channel. Due to the fact that diameter X′ exceeds diameter X, the self-threading body 38 is threaded into the dentin 14. When fully inserted into a channel, the anchor head 42 of each rod projects above the excavated surface 24, as best shown in FIGURE 3, the remainder of the rod being firmly anchored in the dentin. If desired, the projecting anchor head may be bent over to provide for additional retention of the restoration 26 and for the best position of the anchor head.

With a rod inserted in each channel, the superstructure 26 may be built up on the exposed excavated surface 24. Any suitable material may be used for the superstructure. For example, and not by way of limitation, one can use gold foil, silver restoration material, or self-curing resin. In either case, the superstructure is retained on the exposed anchor heads 42. Such retention is improved and assured by the outwardly flared and ridged ends 44, and, as previously indicated, additional retention may be achieved by bending the heads. In addition, there is adherance of the superstructure material to the surface 24. Consequently, it will be apparent that the rods 36, firmly threaded into the dentin 14, serve to anchor the superstructure in position and reinforce its securement to surface 24. Retention is also aided by the nonparallel disposition of the rods 36.

I claim:

1. The method of building a superstructure on a tooth comprising removing decayed or undermined dentition to provide an excavated surface, drilling at least one channel from said surface into the tooth dentin of a predetermined diameter; inserting therein a self-threading rod having a diameter greater than said channel diameter by the application of slight downward pressure simultaneously with turning the same so that the self-threading portion of the rod both forms complementary threads and is threadably engaged to the tooth wall bounding said channel, the rod being thus inserted into the channel so that a portion thereof projects above the excavated surface and building a superstructure on the tooth about the projecting portion of the rod.

2. The method of building a superstructure on a tooth comprising removing decayed or undermined dentition to provide an excavated surface, drilling at least one channel from said surface into the tooth dentin, said channel having a diameter smaller than the diameter of a self-threading rod to be received therein, inserting a self-threading rod into said channel until resistance indicates the floor of the channel to have been reached, a portion of said rod projecting above the excavated surface and building a superstructure on the tooth about the projecting portion of said rod.

3. The method of securing a threaded reinforcing rod of a specific diameter in a tooth comprising drilling at least one channel from a tooth surface into the tooth dentin, the diameter of the channel being smaller than the diameter of the reinforcing rod and progressively introducing said reinforcing rod into said channel by rotating the same so as to form threads in the interior wall of said channel by the self-threading action of said self-threaded reinforcing rod.

References Cited

UNITED STATES PATENTS

| 114,454 | 5/1871 | Mack | 32—15 |
| 403,428 | 5/1889 | Hansen | 32—13 |
| 143,418 | 10/1873 | Osmond | 32—15 |
| 1,018,803 | 2/1912 | Anderberg | 32—15 |
| 1,312,120 | 8/1919 | Hurtt | 32—15 |
| 2,411,758 | 11/1946 | Ruetz | 32—13 |

FOREIGN PATENTS 13,918  1895  Great Britain.

ROBERT PESHOCK, *Primary Examiner.*